(12) United States Patent
Cheytanov (10) Patent No.: US 7,331,615 B2
(45) Date of Patent: Feb. 19, 2008

(54) PIPE UNION WITH EXTENSION

(76) Inventor: Dimitre Cheytanov, 4725 N. Kasson Ave., #3, Chicago, IL (US) 60630

( * ) Notice: Subject to any disclaimer, the term of this patent is extended or adjusted under 35 U.S.C. 154(b) by 177 days.

(21) Appl. No.: 11/100,297

(22) Filed: Apr. 6, 2005

(65) Prior Publication Data
US 2006/0226654 A1 Oct. 12, 2006

(51) Int. Cl.
*F16L 19/00* (2006.01)
(52) U.S. Cl. .................. 285/354; 285/348; 285/389
(58) Field of Classification Search ............. 285/332, 285/332.1, 348, 354, 385, 386, 389, 332.2, 285/332.3, 261, 263, 271, 328
See application file for complete search history.

(56) References Cited
U.S. PATENT DOCUMENTS

| | | | | |
|---|---|---|---|---|
| 769,654 A | * | 9/1904 | Kemper | 285/354 |
| 812,642 A | * | 2/1906 | Crombie | 285/350 |
| 974,975 A | * | 11/1910 | Kelly | 285/55 |
| 1,615,536 A | * | 1/1927 | Del Mar | 285/32 |

* cited by examiner

*Primary Examiner*—Daniel P. Stodola
*Assistant Examiner*—Fannie C. Kee (57) ABSTRACT

A pipe union with extension for interconnecting a first length and a second length of coaxial pipe may include a first annular pipe member attachable to the first length of pipe. The first annular pipe member may incorporate a circumferential flange having a shoulder. The first annular pipe member may comprise a front face which faces the first length of pipe, and a rear face which faces in a direction of the second length of pipe. The pipe union may also comprise a fastening member incorporating an inwardly extending flange with a central passageway adapted to fit around the first annular pipe member. The inwardly extending flange may be adapted to abut the shoulder as the fastening member is fitted over the first annular pipe member. The fastening member may comprise thread means formed on an inner surface of the fastening member.

21 Claims, 4 Drawing Sheets

PIPE UNION WITH EXTENSION

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to plumbing parts. More specifically, certain embodiments of the invention relate to a pipe union with extension.

BACKGROUND OF THE INVENTION

Pipe unions are widely utilized for interconnecting separate lengths of pipes. For example, a pipe union may be utilized to connect two separate long runs of pipe. In addition, a pipe union may be utilized to repair a break, or rupture, in a run of pipe. In such instances, a short length of the ruptured pipe may be removed and the resulting two lengths of pipe may be connected via a pipe union.

Figure 1:
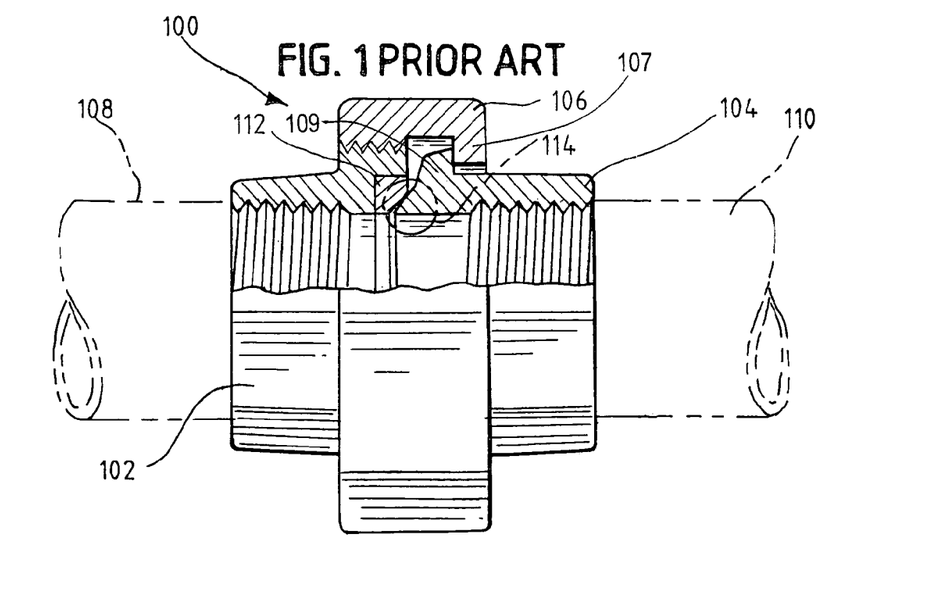
FIG. 1 is a partial cross-sectional view of a prior art pipe union.

FIG. 1 is a partial cross-sectional view of a prior art pipe union. Referring to FIG. 1, the pipe union 100 comprises a first annular pipe member 104, a second annular pipe member 102, and a fastening member 106. The first annular pipe member 104 may be adapted to receive a length of pipe 110 and the second annular pipe member 102 may be adapted to receive a length of pipe 108. For example, the annular pipe members 104 and 102 may comprise internal thread means and may be adapted to engage externally-threaded lengths of pipes 110 and 108, respectively, utilizing the thread means. In addition, the annular pipe members 104 and 102 may be welded to corresponding ends of pipes 110 and 108, respectively.

The fastening member 106 may comprise an inwardly extending flange 107. During an installation of the pipe union 100, the annular pipe members 104 and 102 may be attached to the corresponding lengths of pipe 110 and 108, respectively (e.g., by utilizing thread means or welding). The fastening member may be slid over the first annular pipe member 104 so that the inwardly extending flange 107 abuts a shoulder 109 of an extending flange of the first annular pipe member 104. The pipes 110 and 108 may be brought together and the pipe union 100 may be closed by engaging the thread means on the fastening member with the thread means on the second annular pipe member 102. The pipe union 100 may be engaged by tightening the fastening member 106 so that a concave surface from the circumferential area 112 in the second annular pipe member 102 abuts a convex surface of the first annular pipe member 104, as illustrated in area 114 in FIG. 1.

Figure 2:
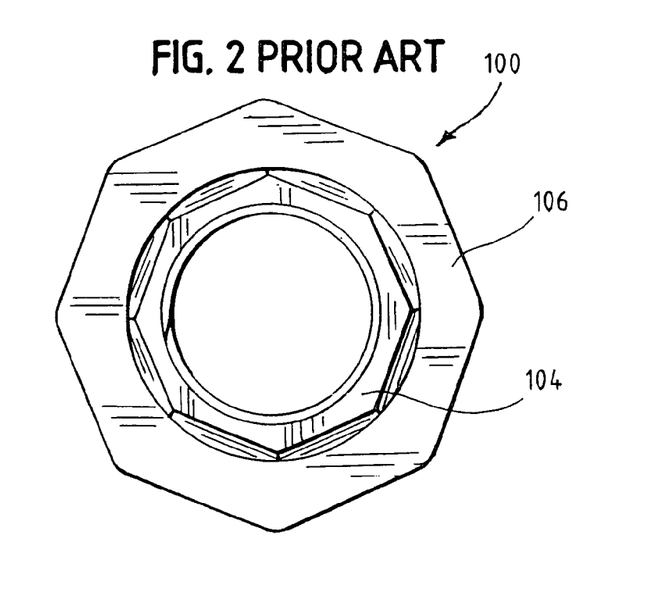
FIG. 2 is a right side elevational view of the prior art pipe union of FIG. 1.

FIG. 2 is a right side elevational view of the prior art pipe union of FIG. 1. Referring to FIG. 2, the side elevational view of the pipe union 100 illustrates that the fastening member 106 and the first annular member 104 may have octagonal shapes for their outside circumferences.

Referring again to FIG. 1, in order to attach the annular pipe members 104 and 102 to the pipes 110 and 108, one of the pipes, either 108 or 110, must be moved aside so that there may be enough space to install the pipe members 104 and 102 to the corresponding pipes 110 and 108. After the pipe members 104 and 102 are installed, the pipe which was moved during the installation of the pipe members may be moved back to its original position so that the two lengths of pipe 110 and 108 are coaxial.

A drawback, therefore, exists with regard to using prior art pipe unions as it is undesirable, or impossible under certain circumstances, to move either pipe 110 or 108 in order to install the pipe union 100. The present invention discloses a solution allowing for the installation of a pipe union without moving any of the pipes intended for connection by the pipe union.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

In an exemplary aspect of the invention, a pipe union for interconnecting a first length and a second length of coaxial pipe may comprise a first annular pipe member attachable to the first length of pipe. The first annular pipe member may incorporate a circumferential flange having a shoulder. The first annular pipe member may comprise a front face which faces the first length of pipe, and a rear face which faces in a direction of the second length of pipe. The pipe union may also comprise a fastening member incorporating an inwardly extending flange with a central passageway adapted to fit around the first annular pipe member. The inwardly extending flange may be adapted to abut the shoulder as the fastening member is fitted over the first annular pipe member. The fastening member may comprise thread means formed on an inner surface of the fastening member.

The pipe union may also comprise a second annular pipe member attachable to the second length of pipe, having thread means formed on an outer surface of the second annular pipe member. The second annular pipe member may be adapted to receive and engage the thread means of the fastening member. The second annular pipe member may have a rear face which faces the second length of pipe, and a front face which faces in a direction of the first length of pipe. The pipe union may also comprise a third annular pipe member having a central passage therethrough. The third annular pipe member may be disposed between the first annular pipe member and the second annular pipe member. The third annular pipe member may have a rear face which faces in a direction of the second length of pipe, and a front face which faces in a direction of the first length of pipe.

The rear face of the third annular pipe member may be adapted to abut the front face of the second annular pipe member and the front face of the third annular pipe member may be adapted to abut the rear face of the first annular pipe member when the thread means of the fastening member engage the thread means of the second annular pipe member. A substantial portion of the rear face of the first annular pipe member may comprises a convex surface. A substantial portion of the rear face of the third annular pipe member may comprise a convex surface. A substantial portion of the front face of the third annular pipe member may comprise a concave surface. A substantial portion of the front face of the second annular pipe member may comprise a concave surface. The pipe union may further comprise a first sealing means having a central passage therethrough.

The first sealing means may be compressible between the first annular pipe member and the third annular pipe member. The first sealing means may comprise an O-ring. The pipe union may comprise a second sealing means having a central passage therethrough. The second sealing means may be compressible between the second annular pipe member and the third annular pipe member. The second sealing means may comprise an O-ring. The first length of coaxial pipe and the second length of coaxial pipe are immovable with relation to a central axis of the first length of coaxial pipe and the second length of coaxial pipe. The first annular pipe member and the third annular pipe member may be adapted to be engaged utilizing a plurality of bolts and a corresponding plurality of nuts.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a pipe union with extension. With regard to a prior art pipe union, a third annular pipe member, or an extension, may be utilized allowing for a bigger distance between the connecting runs of pipe. The bigger distance between the pipes may allow for the corresponding pipe union fittings, or annular members, to be connected to the corresponding pipes without a need for moving any of the pipes. In this regard, a pipe union with extension in accordance with the present invention may be utilized to connect pieces of immovable pipe, for example, or to repair a break or rupture in an immovable pipe. Similarly, a pipe union with extension in accordance with the present invention may be utilized to connect two pieces of pipe where moving either piece of pipe is undesirable.

Figure 3:
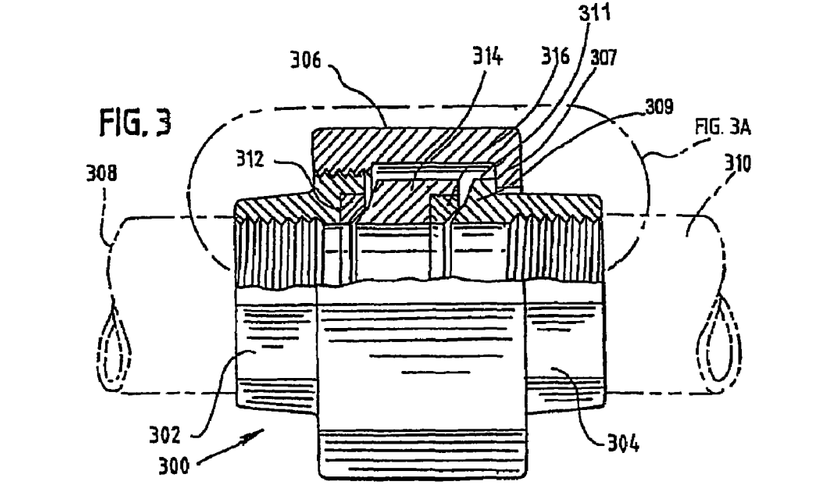
FIG. 3 is a partial cross-sectional view of a pipe union with extension, in accordance with an embodiment of the invention.

FIG. 3 is a partial cross-sectional view of a pipe union with extension, in accordance with an embodiment of the invention. Referring to FIG. 3, the pipe union 300 may comprise a first annular pipe member 304, a second annular pipe member 302, a third annular pipe member, or an extension, 314 and a fastening member 306. The first annular pipe member 304 may be adapted to receive a length of pipe 310 and the second annular pipe member 302 may be adapted to receive a length of pipe 308. For example, the annular pipe members 304 and 302 may comprise internal thread means, or threading on at least a portion of an internal surface, and may be adapted to engage externally-threaded lengths of pipe 310 and 308, respectively, utilizing the thread means. In addition, the annular pipe members 304 and 302 may be welded to corresponding ends of pipes 310 and 308, respectively.

The thread means of the first annular pipe member 304 may be disposed internally near a front face of the first annular pipe member 304. The front face of the first annular pipe member 304 may face the first length of pipe 310 and a rear face of the first annular pipe member 304 may face in a direction of the second length of pipe 308. Similarly, the thread means of the second annular pipe member 302 may be disposed internally near a rear face of the second annular pipe member 302. A front face of the second annular pipe member 302 may face in a direction of the first length of pipe 310 and a rear face of the second annular pipe member 302 may face the second length of pipe 308.

The fastening member 306 may comprise an inwardly extending flange 307. The first annular pipe member 304 may comprise an extending flange portion 309 and the extending flange portion 309 may comprise a flange shoulder 311. The inwardly extending flange 307 may be adapted to abut the flange shoulder 311 when the thread means of fastening member 306 engages the thread means of the second annular pipe member 302.

The third annular pipe member 314 may have a central passage therethrough and may be disposed between the first annular pipe member 304 and the second annular pipe member 302 so that a front face of the third annular pipe member 314 may face the rear face of the first annular pipe member 304 and a rear face of the third annular pipe member 314 may face the front face of the second annular pipe member 302. In instances where the pipe union 300 is closed, the front face of the third annular pipe member 314 may abut against the rear face of the first annular pipe member 304 and the rear face of the third annular pipe member 314 may abut against the front face of the second annular pipe member 302.

Figure 3A:
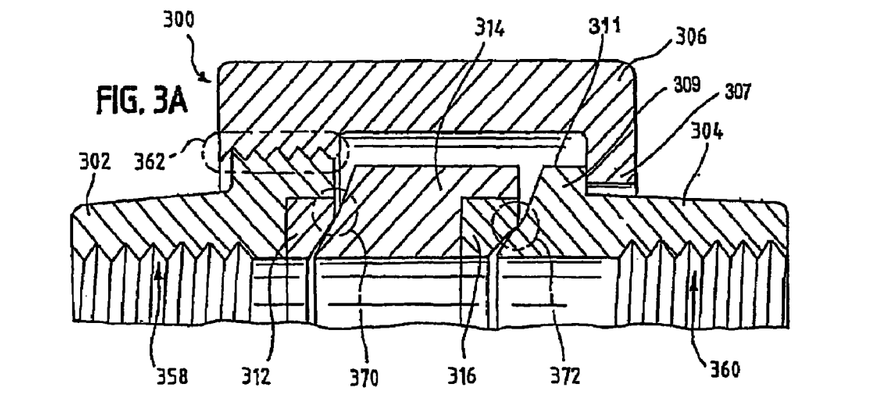
FIG. 3A is a cross-sectional view of a portion of the pipe union with extension of FIG. 3, in accordance with an embodiment of the invention.
Figure 3B:
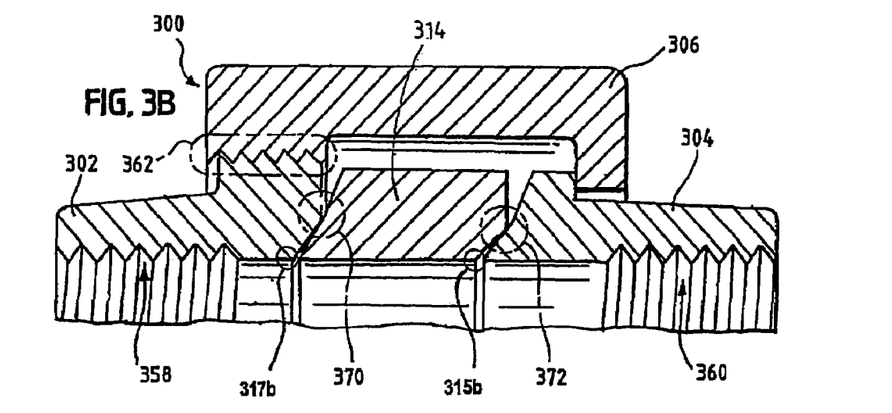
FIG. 3B is a cross-sectional view of a portion of the pipe union with extension of FIG. 3, in accordance with an embodiment of the invention.

FIG. 3B is a cross-sectional view of a portion of the pine union with extension of FIG. 3, in accordance with an embodiment of the invention. In an exemplary aspect of the invention, for example as illustrated in FIG. 3B, the front face of the third annular pipe member 314 may comprise a concave surface 315b and the rear face of the third annular pipe member 314 may comprise a convex surface. In this regard, in order to achieve a better seal between the first annular pipe member 304, the third annular pipe member 314 and the second annular pipe member 302, the front and rear faces of the annular pipe members 304 and 302 may comprise concave and/or convex surfaces so that a concave surface may abut a convex surface, and vice versa. For example, the rear face of the first annular pipe member 304 and the rear face of the third annular pipe member 314 may each comprise a convex surface. The front face of the second annular pipe member may comprise concave surface 317b. Accordingly, in order to achieve a better seal between the first annular pipe member 304, the third annular pipe member 314, and the second annular pipe member 302, the front face of the third annular pipe member 314 and the front face of the second annular pipe member 302 may each comprise a concave surface, such as concave surfaces 315b and 317b. respectively.

In another aspect of the invention, the front face of the third annular pipe member 314 may comprise a convex surface and the rear face of the third annular pipe member 314 may comprise a concave surface. In this regard, in order to achieve a better seal between the first annular pipe member 304, the third annular pipe member 314 and the second annular pipe member 302, the front and rear faces of the annular pipe members 304 and 302 may comprise concave and/or convex surfaces so that a concave surface may abut a convex surface, and vice versa. For example, the rear face of the first annular pipe member 304 and the rear face of the third annular pipe member 314 may each comprise a concave surface. Accordingly, in order to achieve a better seal between the first annular pipe member 304, the third annular pipe member 314, and the second annular pipe member 302, the front face of the third annular pipe member 314 and the front face of the second annular pipe member 302 may each comprise a convex surface.

In yet another aspect of the invention, the front and the rear faces of the third annular pipe member 314 may each comprise a flat surface. In this regard, in order to achieve a better seal between the first annular pipe member 304, the third annular pipe member 314 and the second annular pipe member 302, the front and rear faces of the annular pipe members 304 and 302 may also comprise flat surfaces. Additionally, in instances when the front and rear faces of the annular pipe members 304, 314, and 302 comprise flat surfaces, a gasket, or an O-ring, may be utilized between the first annular pipe member 304 and the third annular pipe member 314, and between the third annular pipe member 314 and the second annular pipe member 302.

In an exemplary aspect of the invention, for example as illustrated in FIGS. 3 and 3A. the front face of the third annular pipe member may comprise a seat ring 316. The seat ring 316 may be pressed into the body of the third annular pipe member 314 and may comprise a softer metal than the metal used for making the third annular pipe member 314. For example, the pipe union 300, including the third annular pipe member 314, may be manufactured from iron, such as a high grade malleable iron, while the seat ring 314 may be manufactured from brass or another metal. By utilizing a third annular pipe member 314 with a seat ring 316, better friction and tighter connection may be effectuated between the first annular pipe member 304 and the third annular pipe member 314.

In another aspect of the invention, the front face of the second annular pipe member may comprise a seat ring 312. The seat ring 312 may be pressed into the body of the second annular pipe member 302 and may comprise a softer metal than the metal used for making the second annular pipe member 302. For example, the pipe union 300, including the second annular pipe member 302, may be manufactured from iron, such as a high grade malleable iron, while the seat ring 312 may be manufactured from brass or another metal. By utilizing a second annular pipe member 302 with a seat ring 312, better friction and tighter connection may be effectuated between the third annular pipe member 314 and the second annular pipe member 302.

Although FIG. 3 illustrates the third annular pipe member 314 as being of fixed length (i.e., the distance between the front and rear face of the third annular pipe member 314 is fixed), the present invention may not be so limited. Accordingly, the third annular pipe member 314 may comprise a different length so that the pipe union 300 may be utilized to connect pipes 308 and 310 with varying distances between them. As fastening member 306 is utilized to engage the first annular pipe member 304 and the second annular pipe member 302, with the third annular pipe member 314 disposed between the annular pipe members 302 and 304, the length of the fastening member 306 may be proportional to the length of the third annular pipe member 314. In this regard, as the length of the third annular pipe member 314 increases, the length of the fastening member 306 increases as well.

During an exemplary installation of the pipe union 300, the annular pipe members 304 and 302 may be attached to the corresponding lengths of pipe 310 and 308, respectively (e.g., by utilizing thread means or welding). The third annular pipe member 314 may then be disposed between the first annular pipe member 304 and the second annular pipe member 302. The fastening member 306 may then be slid over the first annular pipe member 304 so that the nwardly extending flange 307 abuts the flange shoulder 311 of the extending flange 309 of the first annular pipe member 304. The pipe union 300 may be closed by engaging the thread means on the fastening member 306 with the thread means on the second annular pipe member 302. The fastening member 306 may then be tightened so that the rear face of the first annular pipe member 304 abuts the front face of the third annular pipe member 314 and the rear face of the third annular pipe member 314 abuts the front face of the second annular pipe member 302, as illustrated in FIG. 3A.

FIG. 3A is a cross-sectional view of a portion of the pipe union with extension of FIG. 3, in accordance with an embodiment of the invention. Referring to FIG. 3A, the pipe union 300 may comprise the first annular pipe member 304, the second annular pipe member 302, and the third annular pipe member, or a pipe union extension 314. In an exemplary aspect of the invention, the first annular pipe member 304 may comprise internal threading means 360 and the second annular pipe member 302 may comprise internal threading means 358. The threading means 360 may be disposed on an internal surface of the first annular pipe member 304 and the threading means 358 may be disposed on an internal surface of the second annular pipe member 302. The threading means 358 and 360 may be utilized for connecting corresponding lengths of pipe to the second annular pipe member 302 and the first annular pipe member 304, respectively.

In addition, the fastening member 306 may comprise thread means disposed on an internal surface thereof, and the second annular pipe member 302 may comprise another thread means disposed on an external surface thereof. In this regard, the thread means of the fastening member 306 may be adapted to engage the thread means on the external surface of the second annular pipe member 302 when the pipe union 300 is closed, as illustrated by the thread connection 362 in FIG. 3A.

During an exemplary installation of the pipe union 300, the annular pipe members 304 and 302 may be attached to the corresponding lengths of pipe by, for example, utilizing thread means 360 and 358. The third annular pipe member 314 may then be disposed between the first annular pipe member 304 and the second annular pipe member 302. The fastening member 306 may then be slid over the first annular pipe member 304 so that the inwardly extending flange 307 abuts the flange shoulder 311 of the extending flange 309 of the first annular pipe member 304. The pipes union 300 may be closed by engaging the thread means on the fastening member 306 with the thread means on the second annular pipe member 302, resulting in thread means commection 362. The fastening member 306 may then be tightened so that the rear face of the first annular pipe member 304 abuts the front face of the third annular pipe member 314 in area 372, and the rear face of the third annular pipe member 314 abuts the front face of the second annular pipe member 302, as illustrated in FIG. 3A.

Figure 4:
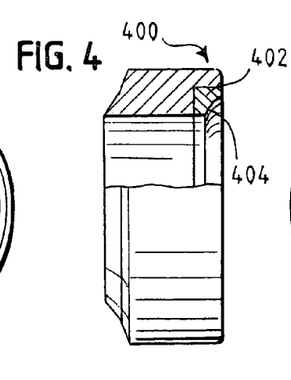
FIG. 4 is a partial cross-sectional view of the pipe union extension of the pipe union of FIG. 3, in accordance with an embodiment of the invention.

FIG. 4 is a partial cross-sectional view of the pipe union extension of the pipe union of FIG. 3, in accordance with an embodiment of the invention. Referring to FIG. 4, the pipe union extension, or the third annular pipe member 400, may comprise a seat ring 402. The seat ring 402 may be pressed into the body of the third annular pipe member 400 and may comprise a softer metal than the metal used for making the third annular pipe member, or the pipe union extension 400. For example, the pipe union extension 400 and a pipe union utilizing the pipe union extension 400 may each be manufactured from iron, such as a high grade malleable iron. The seat ring 402, however, may be manufactured from brass, or another softer metal or alloy. By utilizing the pipe union extension 400 with the seat ring 402, better friction and tighter connection may be effectuated by the pipe union utilizing the pipe union extension 400.

In an exemplary aspect of the invention, the pipe union extension 400 may comprise a concave surface 404 and a convex surface on an opposite side of the pipe union extension 400. The convex and concave surfaces of the pipe union extension 400 may be utilized so that a better connection may be achieved within the pipe union utilizing the pipe union extension 400.

Figure 5:
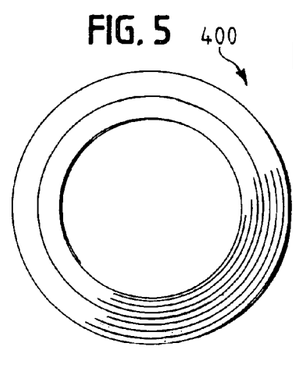
FIG. 5 is a left side elevational view of the pipe union extension of FIG. 4, in accordance with an embodiment of the invention.

FIG. 5 is a left side elevational view of the pipe union extension of FIG. 4, in accordance with an embodiment of the invention. Referring to FIG. 5, there is illustrated a left side elevational view of the pipe union extension 400 having a central passageway therethrough.

Figure 6:
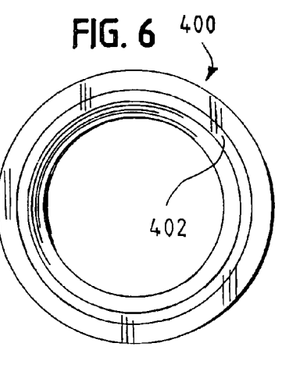
FIG. 6 is a right side elevational view of the pipe union extension of FIG. 4, in accordance with an embodiment of the invention.

FIG. 6 is a right side elevational view of the pipe union extension of FIG. 4, in accordance with an embodiment of the invention. Referring to FIG. 6, there is illustrated a right side elevational view of the pipe union extension 400 having a central passageway therethrough, with a seat ring 402.

Figure 7:
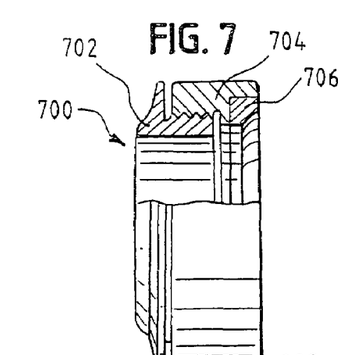
FIG. 7 is a partial cross-sectional view of a pipe union extension in a compact state, in accordance with an embodiment of the invention.

FIG. 7 is a partial cross-sectional view of a pipe union extension in a compact state, in accordance with an embodiment of the invention. Referring to FIG. 7, the pipe union extension 700 may comprise a first extension member 702 and a second extension member 704. The second extension member 704 may comprise a seat ring 706. The seat ring 706 may be made of softer metal such as brass, for example, so that a better fit may be achieved between the extension member 700 and other parts of the pipe union (for example, as explained above with regard to FIGS. 3 and 3A).

In one aspect of the invention, the first extension member 702 may comprise thread means on an external surface thereof, and the second extension member 704 may comprise thread means on an internal surface thereof. In this regard, the first extension member 702 and the second extension member 704 may be engaged via their corresponding thread means.

Referring again to FIGS. 3 and 7, the pipe union extension 700 may be utilized within the pipe union 300 (in place of the pipe union extension, or the third annular pipe member, 314). During an exemplary installation of the pipe union 300, the annular pipe members 304 and 302 may be attached to the corresponding lengths of pipe 310 and 308, respectively (e.g., by utilizing thread means or welding). The pipe union extension 700 may then be disposed between the first annular pipe member 304 and the second annular pipe member 302. The first extension member 702 may then be adjusted in relation to the second extension member 704 utilizing their corresponding thread means. For example, after the pipe union extension 700 is disposed between the first annular pipe member 304 and the second annular pipe member 302, if there is still a distance between the pipe union extension 700 and the first annular pipe member 304 and the second annular pipe member 302, the first extension member 702 may rotated away from the second extension member 704 until there is a tight fit between the pipe union extension 700 and the first annular pipe member 304 and the second annular pipe member 302 (an extended state of the pipe union extension 700 with the first extension member 702 rotated away from the second extension member 704 is illustrated in FIG. 7A).

The fastening member 306 may then be slid over the first annular pipe member 304 so that the inwardly extending flange 307 abuts the flange shoulder 311 of the extending flange 309 of the first annular pipe member 304. The pipes 310 and 308 may then be connected by closing the pipe union 300. The pipe union 300 may be closed by engaging the thread means on the fastening member 306 with the thread means on the second annular pipe member 302. The fastening member 306 may then be tightened so that the rear face of the first annular pipe member 304 abuts the front face of the pipe union extension 700 and the rear face of the pipe union extension 700 abuts the front face of the second annular pipe member 302, as illustrated in FIG. 3.

Figure 7A:
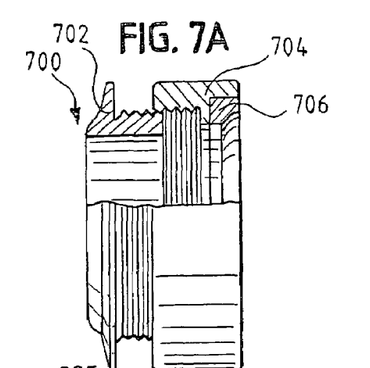
FIG. 7A is a partial cross-sectional view of a pipe union extension in an expanded state, in accordance with an embodiment of the invention.

FIG. 7A is a partial cross-sectional view of a pipe union extension in an expanded state, in accordance with an embodiment of the invention.

Figure 8:
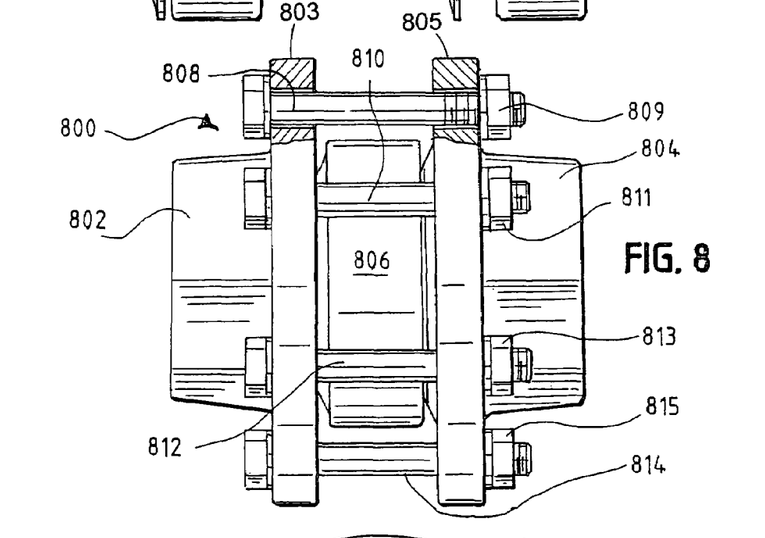
FIG. 8 is a partial cross-sectional view of a bolted pipe union with extension, in accordance with an embodiment of the invention.

FIG. 8 is a partial cross-sectional view of a bolted pipe union with extension, in accordance with an embodiment of the invention. Referring to FIG. 8, the pipe union 800 may comprise a first annular pipe member 804, a second annular pipe member 802, and a third annular pipe member, or pipe union extension, 806. The first annular pipe member 804 and the second annular pipe member 802 may be adapted to receive lengths of pipe (not pictured in FIG. 8).

In an exemplary aspect of the invention, the first annular pipe member 804 and the second annular pipe member 802 within the pipe union 800 may be adapted to be engaged utilizing a plurality of bolt connections. For example, the first annular pipe member 804 and the second annular pipe member 802 may each comprise circumferential flange surfaces 805 and 803, respectively, adapted to receive bolts therethrough. In this regard, referring to FIGS. 8 and 9, bolts 808, 810, 812, 814, 816, and 818 may be utilized with corresponding nuts 809, 811, 813, 815, 817, and 819 to tighten the first annular pipe member 804 and the second annular pipe member 802, with the pipe union extension 806 disposed between the first annular pipe member 804 and the second annular pipe member 802 (as illustrated in FIG.8).

Figure 9:
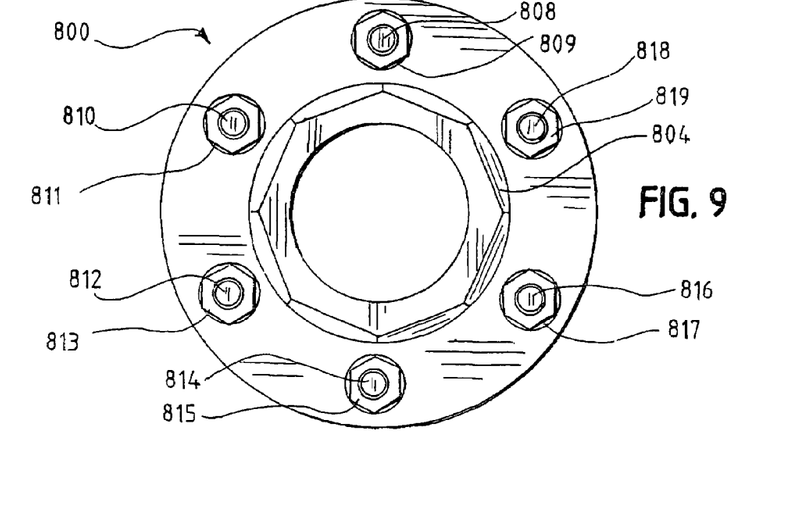
FIG. 9 is a right side elevational view of the bolted pipe union with extension of FIG. 8, in accordance with an embodiment of the invention.

During an exemplary installation of the pipe union 800, the annular pipe members 804 and 802 may be attached to corresponding lengths of pipe (not pictured in FIGS. 8 and 9). The pipe union extension 806 may then be disposed between the first annular pipe member 804 and the second annular pipe member 802. Bolts 808, 810, 812, 814, 816, and 818 may then be utilized with corresponding nuts 809, 811, 813, 815, 817, and 819 to tighten the first annular pipe member 804 and-the second annular pipe member 802.

FIG. 9 is a right side elevational view of the bolted pipe union with extension of FIG. 8, in accordance with an embodiment of the invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A pipe union for interconnecting a first length and a second length of coaxial pipe, the pipe union comprising:
    a first annular pipe member attachable to said first length of pipe, said first annular pipe member incorporating a circumferential flange having a shoulder, and said first annular pipe member having a front face which faces said first length of pipe and a rear face which faces in a direction of said second length of pipe;
    a fastening member incorporating an inwardly extending flange with a central passageway adapted to fit around said first annular pipe member, said inwardly extending flange adapted to abut said shoulder as said fastening member is fitted over said first annular pipe member, and having thread means formed on an inner surface of said fastening member;
    a second annular pipe member attachable to said second length of pipe, having thread means formed on an outer surface of said second annular pipe member and adapted to receive and engage said thread means of said fastening member, said second annular pipe member having a rear face which faces said second length of pipe and a front face which faces in a direction of said first length of pipe; and
    a third annular pipe member having a central passage therethrough, said third annular pipe member disposed between said first annular pipe member and said second annular pipe member, said third annular pipe member having a rear face which faces in a direction of said second length of pipe and a front face which faces in a direction of said first length of pipe, said rear face of said third annular pipe member adapted to abut said front face of said second annular pipe member, and said front face of said third annular pipe member adapted to abut said rear face of said first annular pipe member when said thread means of said fastening member engages said thread means of said second annular pipe member, wherein a first portion of said rear face of said third annular pipe member comprises a convex surface and a corresponding second portion of said front face of said third annular pipe member comprises a concave surface, wherein said first portion is situated directly across from said second portion and both portions have equal vertical elevation with regard to a horizontal center axis of the pipe.

2. The pipe union according to claim 1, wherein a substantial portion of said rear face of said first annular pipe member comprises a convex surface.

3. The pipe union according to claim 1, wherein a substantial portion of said front face of said second annular pipe member comprises a concave surface.

4. The pipe union according to claim 1, comprising a first sealing means having a central passage therethrough, said first sealing means compressible between said first annular pipe member and said third annular pipe member.

5. The pipe union according to claim 4, wherein said first sealing means comprises an O-ring.

6. The pipe union according to claim 4, comprising a second sealing means having a central passage therethrough, said second sealing means compressible between said second annular pipe member and said third annular pipe member.

7. The pipe union according to claim 6, wherein said second sealing means comprises an O-ring.

8. The pipe union according to claim 4, wherein said first sealing means is disposed on a convex surface of said rear face of said first annular pipe member.

9. The pipe union according to claim 4, wherein said first sealing means is disposed on a concave surface of said front face of said third annular pipe member.

10. The pipe union according to claim 6, wherein said second sealing means is disposed on a concave surface of said front face of said second annular pipe member.

11. The pipe union according to claim 6, wherein said second sealing means is disposed on a convex surface of said rear face of said third annular pipe member.

12. The pipe union according to claim 1, wherein said third annular pipe member comprises a first extension member and a second extension member, said first extension member comprising thread means on an external surface of said first extension member, said second extension member comprising thread means on an internal surface of said second extension member, said first extension member adapted to engage said second extension member via said thread means on said internal surface and said thread means on said external surface so that a length of said third annular pipe member may be adjusted according to said engaging between said first extension member and said second extension member.

13. A pipe union for interconnecting a first length and a second length of coaxial pipe, the pipe union comprising:
    a first annular pipe member attachable to said first length of pipe, said first annular pipe member incorporating a circumferential flange having a shoulder, and said first annular pipe member having a front face which faces said first length of pipe and a rear face which faces in a direction of said second length of pipe;
    a fastening member incorporating an inwardly extending flange with a central passageway adapted to fit around said first annular pipe member, said inwardly extending flange adapted to abut said shoulder as said fastening member is fitted over said first annular pipe member, and having thread means formed on an inner surface of said fastening member;
    a second annular pipe member attachable to said second length of pipe, having thread means formed on an outer surface of said second annular pipe member and adapted to receive and engage said thread means of said fastening member, said second annular pipe member having a rear face which faces said second length of pipe and a front face which faces in a direction of said first length of pipe;
    a third annular pipe member having a central passage therethrough, said third annular pipe member disposed between said first annular pipe member and said second annular pipe member, said third annular pipe member having a rear face which faces in a direction of said second length of pipe and a front face which faces in a direction of said first length of pipe, said rear face of said third annular pipe member adapted to abut said front face of said second annular pipe member, and said front face of said third annular pipe member adapted to abut said rear face of said first annular pipe member when said thread means of said fastening member engages said thread means of said second annular pipe member, wherein a substantial portion of said rear face of said third annular pipe member comprises a convex surface and a substantial portion of said front face of said third annular pipe member comprises a concave surface; and a first sealing means having a central passage therethrough, said first sealing means compressible between said first annular pipe member and said third annular pipe member.

14. The pipe union according to claim 13, wherein said first sealing means comprises an O-ring.

15. The pipe union according to claim 13, wherein said first sealing means is disposed on a convex surface of said rear face of said first annular pipe member.

16. The pipe union according to claim 13, wherein said first sealing means is disposed on a concave surface of said front face of said third annular pipe member.

17. The pipe union according to claim 13, wherein said third annular pipe member comprises a first extension member and a second extension member, said first extension member comprising thread means on an external surface of said first extension member, said second extension member comprising thread means on an internal surface of said second extension member, said first extension member adapted to engage said second extension member via said thread means on said internal surface and said thread means on said external surface so that a length of said third annular pipe member may be adjusted according to said engaging between said first extension member and said second extension member.

18. The pipe union according to claim 13, comprising a second sealing means having a central passage therethrough, said second sealing means compressible between said second annular pipe member and said third annular pipe member.

19. The pipe union according to claim 18, wherein said second sealing means comprises an O-ring.

20. The pipe union according to claim 18, wherein said second sealing means is disposed on a concave surface of said front face of said second annular pipe member.

21. The pipe union according to claim 18, wherein said second sealing means is disposed on a convex surface of said rear face of said third annular pipe member.

* * * * *